United States Patent
Facchinello et al.

(10) Patent No.: US 10,023,034 B2
(45) Date of Patent: Jul. 17, 2018

(54) TONNEAU COVER

(71) Applicant: Extang Corporation, Ann Arbor, MI (US)

(72) Inventors: Jerome J. Facchinello, Grand Blanc, MI (US); Charles A. Fabros, Downers Grove, IL (US)

(73) Assignee: Extang Corporation, Ann Arbor, MI (US)

(*) Notice: Subject to any disclaimer, the term of this patent is extended or adjusted under 35 U.S.C. 154(b) by 0 days.

(21) Appl. No.: 15/429,594

(22) Filed: Feb. 10, 2017

(65) Prior Publication Data

US 2017/0151864 A1 Jun. 1, 2017

Related U.S. Application Data

(63) Continuation of application No. 14/831,227, filed on Aug. 20, 2015, now Pat. No. 9,623,737.

(60) Provisional application No. 62/186,703, filed on Jun. 30, 2015.

(51) Int. Cl.
| B60P 7/02 | (2006.01) |
| B60J 7/10 | (2006.01) |
| B60J 7/14 | (2006.01) |

(52) U.S. Cl.
CPC ............... B60J 7/141 (2013.01); B60J 7/106 (2013.01); B60P 7/02 (2013.01)

(58) Field of Classification Search
CPC ........ B60P 7/02; B60J 7/10; B60J 7/02; B60J 7/1607; B60J 7/141; B60J 7/102; B60J 7/106

USPC ............ 296/100.02, 100.06, 100.09, 100.07, 296/100.17

See application file for complete search history.

(56) References Cited

U.S. PATENT DOCUMENTS

| 5,636,893 | A | 6/1997 | Wheatley |
| 5,653,491 | A | 8/1997 | Steffens |
| 6,352,296 | B1 | 3/2002 | Kooiker |
| 7,252,322 | B2 | 8/2007 | Rusu |
| 7,484,788 | B2 | 2/2009 | Calder et al. |
| 8,262,148 | B2 | 9/2012 | Rusher |
| 9,623,737 | B2 * | 4/2017 | Facchinello ............ B60J 7/141 |
| 2004/0245799 | A1 | 12/2004 | Rusu |
| 2007/0035151 | A1 | 2/2007 | Rusu |
| 2007/0210609 | A1 | 9/2007 | Maimin |
| 2013/0015678 | A1 | 1/2013 | Williamson |
| 2016/0176448 | A1 | 6/2016 | Germano |

* cited by examiner

*Primary Examiner* — Gregory A Blankenship
(74) *Attorney, Agent, or Firm* — Harness, Dickey & Pierce, P.L.C.

(57) ABSTRACT

Rigid panel sections can include a rigid panel, a first frame member, a second frame member and a coupling mechanism. The rigid panel can have a first face, a second face opposite the first face, and an edge therebetween. The first face can having a first margin adjacent the edge and the second face can have a second margin adjacent the edge. The first frame member can be disposed along at least a portion of the edge and can have a first flange overlying the first margin. A second frame member, distinct from the first frame member, can be disposed along at least a portion of the edge and can have a second flange overlying the second margin. The coupling mechanism connecting the second frame member and the first frame member together can be positioned outboard of the edge. Methods of assembling the rigid panel sections are also provided.

17 Claims, 6 Drawing Sheets

TONNEAU COVER

CROSS-REFERENCE TO RELATED APPLICATIONS

This application is a continuation of U.S. patent application Ser. No. 14/831,227 filed on Aug. 20, 2015, and which claims the benefit of U.S. Provisional Application No. 62/186,703, filed on Jun. 30, 2015. The entire disclosures of each of the above applications are incorporated herein by reference.

FIELD

The present disclosure relates to tonneau covers for vehicles and, more particularly, relates to a two-piece frame member connected to an edge of a rigid panel of a tonneau cover.

BACKGROUND

This section provides background information related to the present disclosure which is not necessarily prior art.

Tonneau covers have been used for a number of years to cover the truck bed or cargo box of pickup trucks, to protect against dirt, debris, and other environmental contaminants, and to improve the aesthetic quality thereof. Such tonneau covers can be foldable when not being used to cover the bed of the pickup truck or for cargo protection or to otherwise allow access to the truck bed. Tonneau covers which include solid panels can be desirable, for example, to provide strength and rigidity and for their aesthetic quality. The present disclosure provides improvements in foldable tonneau covers incorporating rigid panels and in methods of assembling such tonneau covers.

SUMMARY

This section provides a general summary of the disclosure, and is not a comprehensive disclosure of its full scope or all of its features.

In accordance with one aspect of the present disclosure, a method of assembling a tonneau cover can include providing a rigid panel having a first face, a second face opposite the first face, and an edge therebetween, with the second face having a second margin adjacent the edge, and the first face extending in a first plane and having a first margin adjacent the edge. A first frame member having a hook can be disposed along at least a portion of the edge of the rigid panel such that a first flange of the first frame member is overlying the first margin. A second frame member, distinct from the first frame member, having a catch can be disposed along at least a portion of the edge of the rigid panel such that a second flange of the second frame member is overlying the second margin. The first and second frame members can be moved toward each other in a coupling direction that is perpendicular to the first plane causing the hook of the first frame member and the catch of the second frame member to interlock with each other outboard of the edge of the rigid panel and coupling the first and second frame members together.

In accordance with other aspects of the present disclosure, causing the hook of the first frame member and the catch of the second frame member to interlock with each other can apply a compressive force to the rigid panel. In addition, a space can be provided adjacent the catch that is sufficient to permit movement of the hook in the coupling direction beyond a point at which the hook engages the catch to apply the compressive force.

In accordance with other aspects of the present disclosure, the hook and the catch can be provided with interlocking surfaces oriented to prevent disengagement from each other after interlocking the hook and the catch together. In addition, this can include providing the hook and the catch with interlocking surfaces oriented substantially perpendicular to the coupling direction.

In accordance with another aspect of the present disclosure, a tonneau cover for covering a truck bed can include a plurality of rigid panel sections configured to cover the at least a portion of the truck bed. At least one of the plurality of rigid panel sections can include a rigid panel, a first frame member, a second frame member and a coupling mechanism connecting the first frame member and the second frame member together. The rigid panel can have a first face extending in a first plane, a second face opposite the first face, and an edge therebetween. The first face of the rigid panel can having a first margin adjacent the edge. The second face of the rigid panel can have a second margin adjacent the edge. The first frame member can be disposed along at least a portion of the edge and can have a first flange overlying the first margin. The second frame member can be distinct from the first frame member and can be disposed along at least a portion of the edge and can have a second flange overlying the second margin. A coupling mechanism can connect the second frame member and the first frame member together outboard of the edge. The coupling mechanism can include a first coupling element extending in a direction perpendicular to the first plane and couplable with a second coupling element. The first and second coupling elements can be oriented to couple together through relative movement of the first and second frame members in the direction perpendicular to the first plane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

At the outset, it should be noted that FIGS. 1 through 6 illustrate various example embodiments of the present tonneau cover 10 having alternative structures. However, in the interest of brevity, the embodiments will be described herein using common reference numerals to identify common elements, although the corresponding elements in the various embodiments may not be identical. It should be understood, however, that the present description should not be regarded as limiting the invention to any singular configuration and that alternative configurations, not illustrated, are further within the scope of the present teachings.

Figure 1:
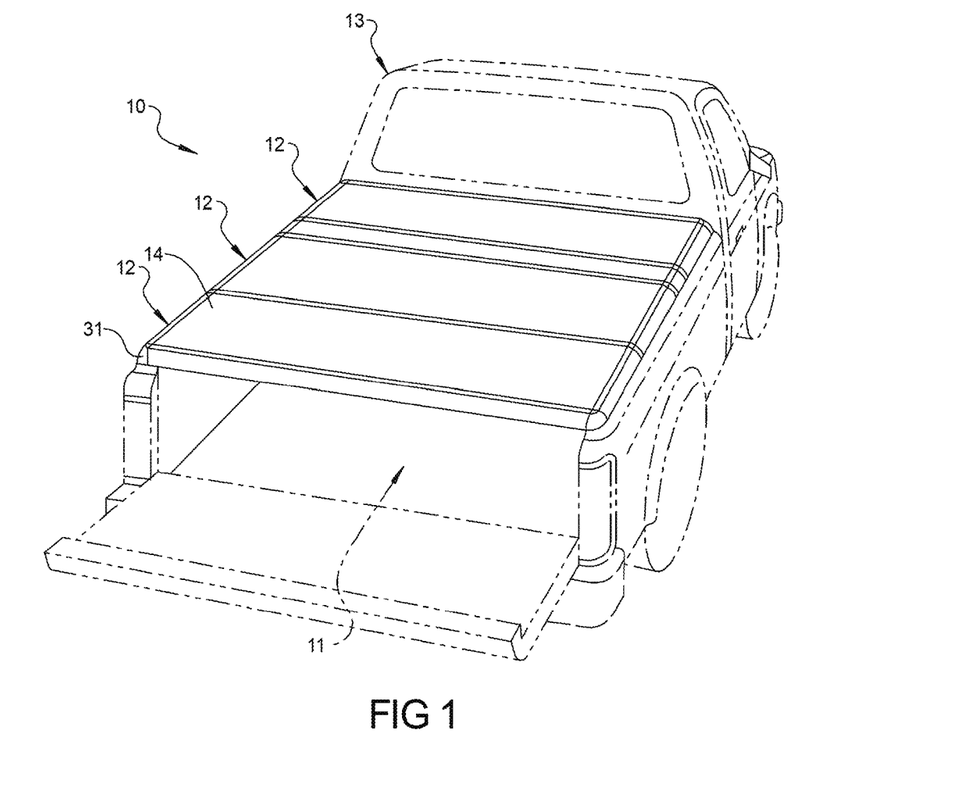
FIG. 1 is a perspective view illustrating a foldable tonneau cover in accordance with the present disclosure in an unfolded configuration extending over a truck bed or cargo box of a pickup truck.
Figure 2:
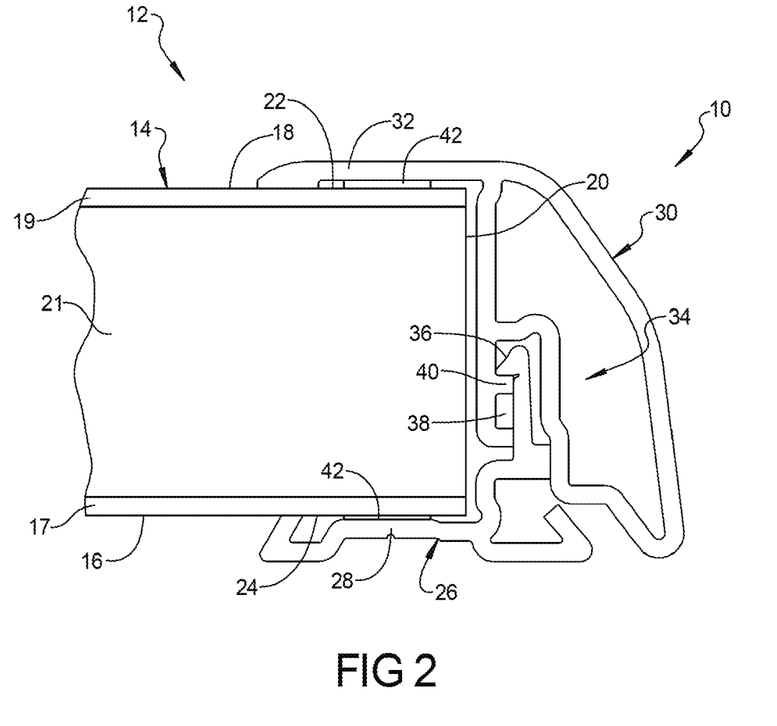
FIG. 2 is a partial cross-section view of one example embodiment of a tonneau cover for a truck bed in accordance with the present disclosure.
Figure 3:
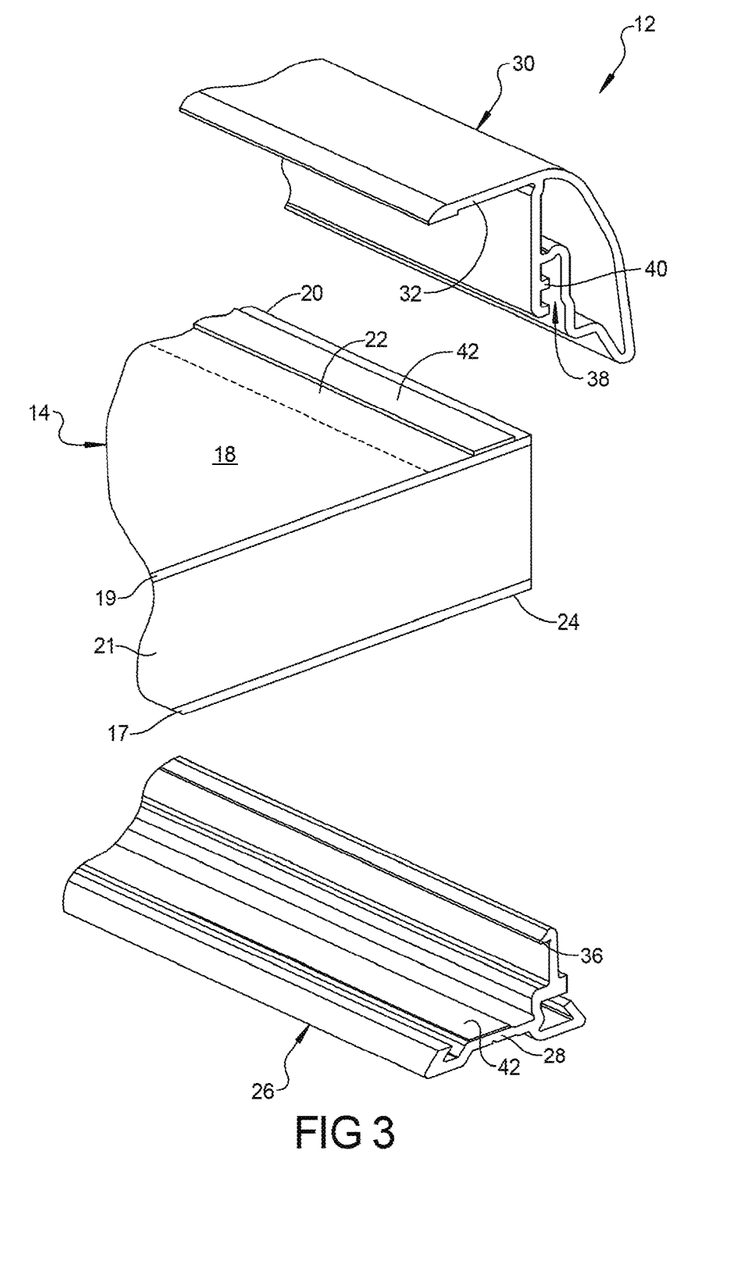
FIG. 3 is a partial exploded view of the embodiment of FIG. 2.

With particular reference to FIG. 1, a tonneau cover 10 for covering a truck bed or cargo box 11 is provided. In some cases, the truck bed or cargo box 11 can be part of a pickup truck 13 as shown. In some embodiments, the tonneau cover 10 can include a plurality of rigid panel sections 12 foldable between a deployed arrangement covering the truck bed 11 and a folded arrangement wherein the panel sections 12 are stacked, allowing access to the truck bed 11.

Referring to FIGS. 1 through 6, the tonneau cover 10 can include at least one rigid section 12. This rigid section 12 can include a rigid panel 14 having a bottom face 16 adapted to or positioned to face the truck bed 11 when the tonneau cover 10 is in the deployed arrangement. The rigid panel 14 can have a top face 18 opposite the bottom face 16, and an edge 20 between the top face 18 and the bottom face 16. The top face 18 can include a top margin 22 adjacent the edge 20. Similarly, the bottom face 16 can include a bottom margin 24 adjacent the edge 20.

In some instances, the top face 18 and bottom face 16 can be provided by top and bottom outer sheet layers or skins, 19 and 17, respectively, which can be made of metal or plastic material, that sandwich a central rigid foam core 21. As non-limiting example materials, skins 17, 19 can be made of aluminum or fiberglass reinforced polymer and the core 21 to which they can be laminated, can be made of a rigid polymeric or thermoplastic olefin.

The tonneau cover 10 can further include a bottom frame member 26 disposed about the edge 20 and having a bottom flange 28 overlying the bottom margin 24. The tonneau cover 10 can also include a top frame member 30, distinct from the bottom frame member 26, disposed about the edge 20 and having a top flange 32 overlying the top margin 22. Although the faces, margins, and flanges are distinguished in this description using the terms "top" and "bottom," it is equally appropriate to use alternative distinguishing language, such as "first" and "second" frame members, or "main" and "secondary" (or "lock strip") frame members.

The tonneau cover 10 includes a coupling mechanism 34 connecting the top frame member 30 and the bottom frame member 26 outboard the edge 20. The coupling mechanism 34 can include a coupling element 40 on one of the frame members 30 and a cooperating coupling element 36 on the other of the frame members 26 that cooperate to couple the top frame member 30 and bottom frame member 26 together. For example, the coupling elements 36 and 40 can interlock or inter-engage with each other.

In some embodiments, one of the top frame member 30 and bottom frame member 26 can comprise a coupling element in the form of a hook 36, and the other of the top frame member 30 and bottom frame member 26 can comprise a cooperating coupling element in the form of a catch feature 40, which can be disposed within a receptacle 38 to insure and retain the interlocking arrangement or position. The coupling mechanism 34 can thus comprise hook 36 received in receptacle 38 to engage cooperating catch feature 40. In some embodiments, catch feature 40 can extend in a direction laterally away from edge 20 and hook 36 can include a flange extending laterally toward edge 20 and engaging the catch feature 40.

In some embodiments, top frame member 30 and bottom frame member 26 can either or both be formed as a unified one-piece extruded strip. For example, in the embodiment of FIGS. 2 through 4C, both of the top frame member 30 and bottom frame member 26 can be a unified extruded metal strip, such as a unified extruded aluminum strip. In the example embodiment of FIGS. 5 and 6, the bottom frame member 26 can be a unified extruded metal strip, while the top frame member 30 can be a unified extruded strip that is more flexible, such as a thinner or more flexible metal material or a plastic material, which can aid in sealing between the panel 14 and the top frame member 30.

In some embodiments, the coupling mechanism, such as the cooperating hook 36 and catch 40 coupling elements, can be integrally formed as a part of such respective extruded strips. In some cases, the coupling mechanism 34 can include automatic or one-step cooperating coupling elements, such as the cooperating inter-engaging or interlocking hook 36 and catch 40 elements. In other words, the coupling mechanism 34 can couple the top frame member 30 and bottom frame member 26 together simply by appropriately positioning them with respect to each other, which can include positioning the hook 36 within a receptacle 38 housing the catch 40.

In other cases, the coupling mechanism 34 can include one or more distinct or separate components beyond the top frame member 30 and the bottom frame member 26. For example, the coupling elements of the coupling mechanism 34 can include screws, pins, rivets, or clips, or other elements while cooperating coupling elements 40 can include threaded or non-threaded apertures, or other separate elements or integral features of one of the top frame member 30 or bottom frame member 26.

In some embodiments, top flange 32 and bottom flange 28 apply a compressive force against opposing sides of the rigid panel 14 when the top frame member 30 and the bottom frame member 26 are coupled together by the coupling mechanism 34 to retain the rigid panel 14 therebetween. In other words, top frame member 30 and bottom frame member 26 and the coupling mechanism 34 can be positioned, can have a structure, or both, that can exert a compressive force against rigid panel 14 when the rigid panel 14 is retained between the top frame member 30 and bottom frame member 26 with these components assembled together in a collective, mated arrangement.

Figure 4A:
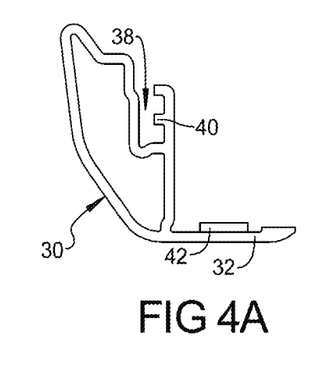
FIGS. 4A, 4B and 4C are partial cross-sectional views illustrating the embodiment of FIG. 2 in various stages during an assembly process in accordance with the present disclosure.
Figure 4B:
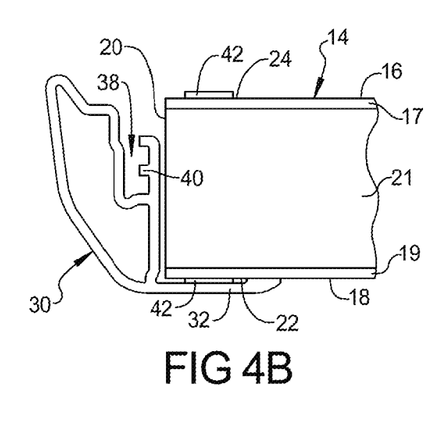
Figure 4C:
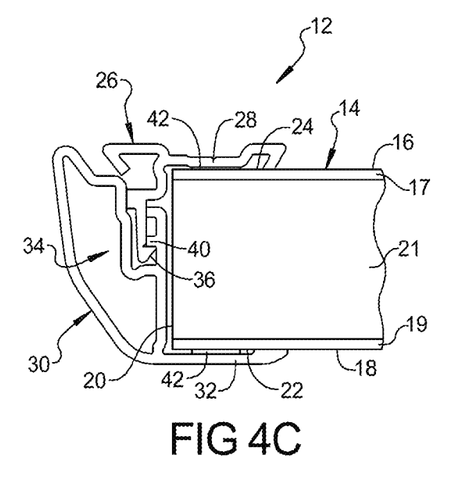
Figure 5:
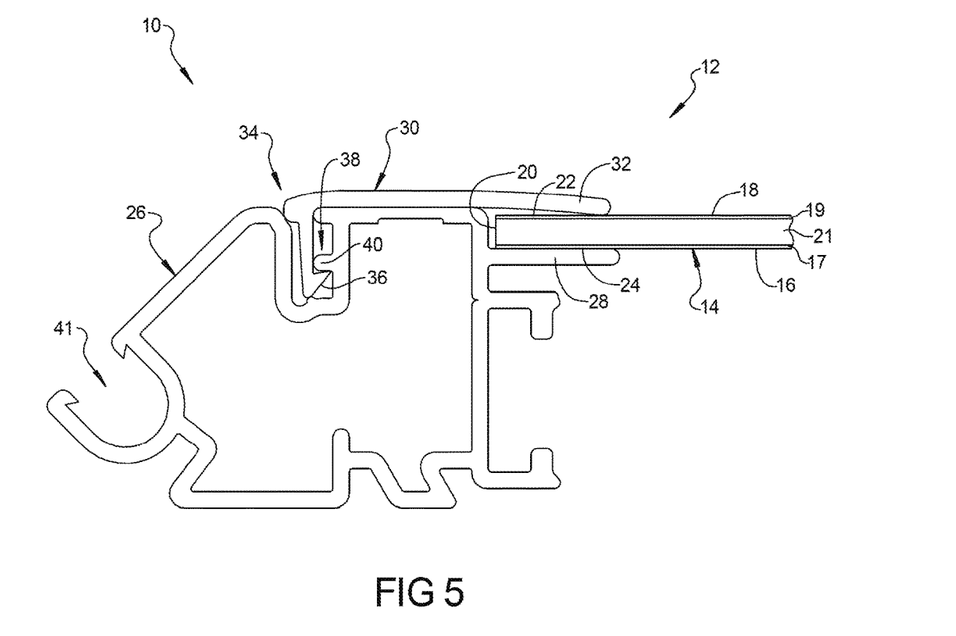
FIG. 5 is a partial cross-section view similar to FIG. 2 of another example embodiment of a tonneau cover for a truck bed in accordance with the present disclosure.
Figure 6:
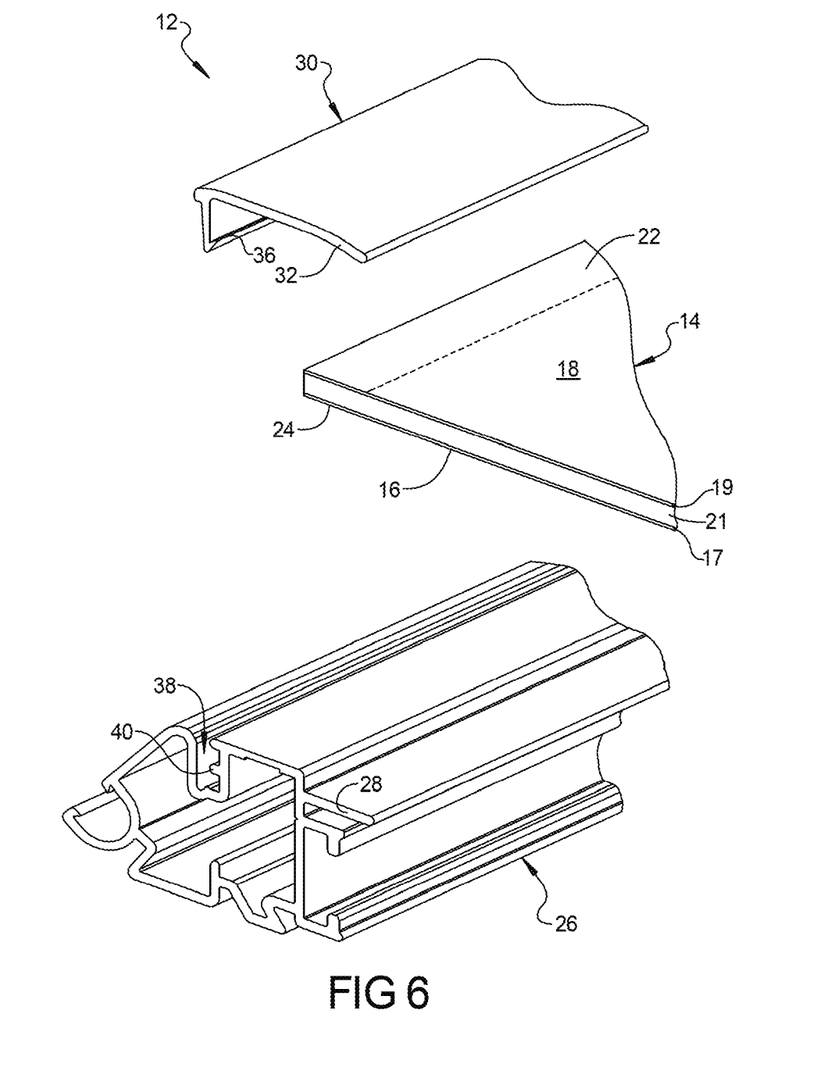
FIG. 6 is a partial exploded view similar to FIG. 3 of the representative embodiment of FIG. 5.

Referring to FIGS. 4A-4C, tonneau cover 10 can comprise a material 42 disposed along an interface between any combination of top frame member 30, bottom frame member 26, and rigid panel 14. In some embodiments, the material 42 can be an adhesive, a sealant, or other suitable material. The material 42 can be applied as a strip, a bead, a liquid, a solid, or any other suitable means. In particular, in some embodiments, the material 42 can be an adhesive and/or sealant applied in the form of a bead to one or both of the top flange 32 or top margin 22 to provide sealing and/or bonding between the top flange 32 and top margin 22. In some embodiments, the material 42 can alternatively or additionally be applied as a bead to one or both of the bottom flange 28 or bottom margin 24 to provide sealing and/or bonding between the bottom flange 28 and the bottom margin 24.

In other cases, the material 42 can alternatively or additionally be applied in the form of a weather-strip or vibration isolation strip as described above with respect to the adhesive and/or sealant bead(s). In other cases, sealing can be partially or completely provided by forming one of the top frame member 30 or bottom frame member 26 of a flexible or resilient material. For example, top frame member 30 or panel lock strip of FIGS. 5 and 6 can comprise a unified extruded plastic flexible, resilient member. Such a structure can provide sealing and or vibration dampening instead of or in addition to the bead or strip material 42 described above.

The description herein of the panels 14 being rigid does not exclude the situation where the rigid panels 14 are partially or completely covered with fabric, textile or other flexible sheet material (not shown). For example, any of the panel 14, top frame member 30, bottom frame member 26, can be partially or fully covered by such a sheet material. As but one example, such a sheet material can cover the top surfaces of the panel 14 and top frame member 30 and can extend into and terminate within a cover retention slot 41.

According to the present teachings, a method of assembling the tonneau cover 10 is further provided. Referring to FIGS. 2 through 4C, the method can include providing a rigid panel 14 having a first or top face 18, a second or bottom face 16 opposite the first face 18, and an edge 20 therebetween. The first face 18 includes a first margin 22 adjacent the edge 20 and the second face 16 includes a second margin 24 adjacent the edge 20.

The method includes disposing a first frame member 30 along at least a portion of the edge 20 of the rigid panel 14 such that a first flange 32 of the first frame member 30 is overlying the first margin 22. A plurality of first frame members 30 can, in some embodiments, be pre-assembled together to form a rectangular frame that is sized to correspond to the dimensions of the rigid panel 14. Such a pre-assembled rectangular frame can be formed, for example, of four first frame members 30 having an identical cross-section. Alternatively, two first frame members 30 can be positioned on opposite sides of the rigid panel 14 and interconnected by intermediate frame members having a different configuration.

Alternatively, an assembled rectangular frame comprising a plurality of the first frame members 30, these second frame members 26 can be formed in place, by individually or separately serially positioning first frame members 30 adjacent a corresponding side or edge 20 of the panel 14. In other embodiments, a complete rectangular frame assembly need not be formed at all. For example, in some embodiments, a first frame member 30 coupled to a second frame member 26 can be provided along only one edge 20 of the rigid panel 14. As another example, a first frame member 30 coupled to a second frame member 26 the first frame members 30 can be provided along only two opposite edges 20 of the rigid panel 14 parallel to each other, without any other frame members along the other set of parallel edges of the panel 14 to complete a rectangular frame. Of course, other embodiments may include any other possible arrangements.

As illustrated in FIG. 4A, the first frame member 30 can, for example, be positioned such that first flange 32 faces generally upwardly. The adhesive and/or sealant material 42 can be readily applied upon the generally upwardly-facing first flange 32. The first margin 22 of the rigid panel 14 can then be positioned directly over the first flange 32 and lowered into place against the adhesive and/or sealant material 42, first flange 32, or both, without the need for relative lateral movement between the first flange 32 and the first margin 22 or rigid panel 14. Avoiding such relative lateral movement can facilitate better adhesion or sealing by the material 42 between the components.

As illustrated in FIG. 4B, the material 42 can be applied to the second margin 24 of the rigid panel 14, with the second margin 24 positioned facing generally upwardly. As illustrated in FIG. 4C, the method can further include disposing a second frame member 26 or locking strip, distinct from the first frame member 30, along at least a portion of the edge 20 of the rigid panel 14 such that the second flange 28 of the second frame member 26 overlays the second margin 24. The second flange 28 of the second frame member 26 can be positioned directly over the bottom or second margin 24 of the rigid panel 14 and lowered into place against the intervening material 42, bottom or second flange 28, or both, without the need for relative lateral movement between the second flange 28 or the material 42, and the second margin 24 of the rigid panel 14, which also can facilitate better adhesion or sealing by the material 42 between the components.

As described above, regarding the first frame members 30, these second frame members 26 can be pre-assembled into a rectangular frame assembly, or can be individually or separately serially positioned above and coupled to a corresponding first frame member 30 along the sides of the panel 14. As the first flange 32 and second flange 28 of the first frame member 30 and the second frame member 26 are being positioned against the corresponding first and second margins, 22 and 24, respectively, the coupling elements 36 and 40 of the coupling mechanism 34 can inter-engage or interlock to couple the first frame member 30 and the second frame member 26 together. In some embodiments, the method can include coupling the first frame member 30 and the second frame member 26 together outboard the edge 20 of the rigid panel 14. In other words, the coupling elements 36 and 40 can be positioned outboard of the edges 20 of the rigid panel 14.

In some embodiments, first and second frame members 30 and 26, respectively, can be coupled together around opposing sides of the panel 14. A first coupling extension of corner frame members 31 can next be inserted into ends of these opposing coupled frame members 30, 26. Then, first and second frame members 30 and 26, respectively, can be positioned and coupled together along the remaining two sides of the panel 14 and around second coupling extensions of each corner frame member 31.

In some embodiments, the adhesive and/or sealant material 42 can be applied between the first flange 32 of the first frame member 30 and the first margin 22 prior to the step of disposing the first frame member 30 along at least the portion of the edge 20 of the rigid panel 14. In some embodiments, the method can include applying an adhesive and/or sealant 42 between the second flange 28 of the second frame member 26 and the second margin 24 prior to the step of disposing the second frame member 26 along at least the portion of the edge 20 of the rigid panel 14. In other embodiments, such adhesive and/or bonding material may be provided at only one of these interfaces, or at neither interface.

The method as described above with regard to the embodiment of FIGS. 2 through 4C identifies the first frame member as the top frame member 30 and the second frame member as the bottom frame member 26. This need not be the case. For example, with regard to the embodiment of FIGS. 5 and 6, the first frame member in the method description above can be bottom frame member 26 and the second frame member can be top frame member 30. Likewise, the method described above with regard to the embodiment of FIGS. 2 through 4C identifies the first flange and first margin as the top flange 32 and top margin 22, respectively, and the second flange and second margin as the bottom flange 28 and bottom margin 24, respectively. With regard to the embodiment of FIGS. 5 and 6, the first flange and first margin can be the bottom flange 28 and bottom margin 24, respectively, and the second flange and second margin can be the top flange 32 and top margin 22, respectively.

Example embodiments are provided so that those who are skilled in the art can fully understand the tonneau covers for truck beds in accordance with this disclosure. These example embodiments provide numerous specific details such as examples of specific components, shapes, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Similarly, any aspect or combination of aspects illustrated or described in reference to one embodiment may be used in combination with one or more aspects illustrated or described in reference to any other embodiments. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of assembling a tonneau cover, the method comprising:
    providing a rigid panel having a first face, a second face opposite the first face, and an edge therebetween, the second face having a second margin adjacent the edge, the first face extending in a first plane and having a first margin adjacent the edge;
    disposing a first frame member having a hook along at least a portion of the edge of the rigid panel such that a first flange of the first frame member is overlying the first margin;
    disposing a second frame member, distinct from the first frame member, having a catch along at least a portion of the edge of the rigid panel such that a second flange of the second frame member is overlying the second margin;
    moving the first and second frame members toward each other in a coupling direction that is perpendicular to the first plane causing the hook of the first frame member and the catch of the second frame member to interlock with each other outboard of the edge of the rigid panel and coupling the first and second frame members together, wherein causing the hook of the first frame member and the catch of the second frame member to interlock with each other applies a compressive force to the rigid panel; and
    providing a space adjacent the catch sufficient to permit movement of the hook in the coupling direction beyond a point at which the hook engages the catch to apply the compressive force.

2. The method according to claim 1, further comprising providing the hook and the catch with interlocking surfaces oriented to prevent disengagement from each other after interlocking the hook and the catch together.

3. The method according to claim 2, wherein providing the hook and the catch with interlocking surfaces oriented to prevent disengagement from each other after interlocking the hook and the catch together comprises providing the hook and the catch with interlocking surfaces oriented substantially perpendicular to the coupling direction.

4. The method according to claim 1, further comprising:
    applying an adhesive between the first flange of the first frame member and the first margin prior to the step of disposing the first frame member along at least the portion of the edge of the rigid panel.

5. The method according to claim 1, further comprising:
applying an adhesive between the second flange of the second frame member and the second margin prior to the step of disposing the second frame member along at least the portion of the edge of the rigid panel.

6. The method according to claim 1, further comprising:
applying a sealant between the first flange of the first frame member and the first margin prior to the step of disposing the first frame member along at least the portion of the edge of the rigid panel.

7. The method according to claim 1, further comprising:
applying a sealant between the second flange of the second frame member and the second margin prior to the step of disposing the second frame member along at least the portion of the edge of the rigid panel.

8. A tonneau cover for covering a cargo bed, the tonneau cover comprising:
a plurality of rigid panel sections configured to cover the at least a portion of the cargo bed, at least one of the plurality of rigid panel sections comprising:
a rigid panel having a first face extending in a first plane, a second face opposite the first face, and an edge therebetween, the first face having a first margin adjacent the edge, the second face having a second margin adjacent the edge;
a first frame member disposed along at least a portion of the edge and having a first flange overlying the first margin;
a second frame member distinct from the first frame member, the second frame member being disposed along at least a portion of the edge and having a second flange overlying the second margin; and
the first and second frame members including a coupling mechanism connecting the second frame member and the first frame member outboard the edge, the coupling mechanism including a hook extending along at least a portion of the edge of the rigid panel and couplable with a catch extending along at least the portion of the edge of the rigid panel, the hook and the catch being oriented to couple together through relative movement of the first and second frame members in a coupling direction that is perpendicular to the first plane and being positioned to apply a compressive force to the rigid panel when coupled together, and the coupling mechanism including a space adjacent the catch sufficient to permit movement of the hook in the coupling direction beyond a point at which the hook engages the catch.

9. The tonneau panel according to claim 8 wherein the hook and the catch include interlocking surfaces oriented substantially parallel to the first plane.

10. The tonneau panel according to claim 8 wherein the plurality of rigid panel sections is foldable between a deployed arrangement for covering the cargo bed and a folded arrangement wherein the panel sections are stacked for accessing the cargo bed.

11. The tonneau cover according to claim 8 wherein the catch and the space are disposed within a receptacle of one at the first and second frame members.

12. The tonneau cover according to claim 8 wherein the catch comprises a flange extending in a direction away from the edge, and wherein the hook comprises a flange extending toward the edge and engaging the catch.

13. The tonneau cover according to claim 8 wherein the first frame member is formed of an extruded strip, and wherein the second frame member is formed of an extruded strip.

14. The tonneau cover according to claim 8, further comprising an adhesive bonding the first flange and the first margin.

15. The tonneau cover according to claim 8, further comprising a first adhesive bonding the first flange and the first margin, and a second adhesive bonding the second flange and the second margin.

16. The tonneau cover according to claim 8, further comprising a first sealant forming a seal between the first flange and the first margin.

17. The tonneau cover according to claim 8, further comprising a first sealant forming a first seal between the first flange and the first margin, and a second sealant forming a seal between the second flange and the second margin.

* * * * *

UNITED STATES PATENT AND TRADEMARK OFFICE
CERTIFICATE OF CORRECTION

| | | |
|---|---|---|
| PATENT NO. | : 10,023,034 B2 | Page 1 of 1 |
| APPLICATION NO. | : 15/429594 | |
| DATED | : July 17, 2018 | |
| INVENTOR(S) | : Facchinello et al. | |

It is certified that error appears in the above-identified patent and that said Letters Patent is hereby corrected as shown below:

In the Claims

Column 10, Claim 9, Line 8, delete "panel" and insert --cover-- therefor

Column 10, Claim 10, Line 11, delete "panel" and insert --cover-- therefor

Column 10, Claim 11, Line 18, delete "at" and insert --of-- therefor

Signed and Sealed this
Eighteenth Day of September, 2018

Andrei Iancu
*Director of the United States Patent and Trademark Office*